United States Patent [19]

Valente

[11] 4,403,443

[45] Sep. 13, 1983

[54] FLOWER POT DEVICE

[76] Inventor: Nicola J. Valente, Minnesota Ave., North Greenbush, N.Y. 12144

[21] Appl. No.: 425,449

[22] Filed: Sep. 28, 1982

[51] Int. Cl.³ .......................................... A01G 13/00
[52] U.S. Cl. ..................................................... 47/32
[58] Field of Search .................. 47/32, 41.11, 25, 66, 47/70, 47

[56] References Cited

U.S. PATENT DOCUMENTS

| | | | |
|---|---|---|---|
| 915,897 | 3/1909 | Skorness | 47/32 |
| 1,453,810 | 5/1923 | Sleen | 47/25 |
| 1,465,636 | 8/1923 | Gmelin | 47/41.11 |
| 2,126,766 | 8/1938 | Gerbermann | 47/41.11 |
| 2,381,253 | 8/1945 | Bierwert | 47/41.11 |
| 2,785,508 | 3/1957 | Coleman | 47/66 |
| 2,822,644 | 2/1958 | Berger | 47/32 |
| 2,900,760 | 8/1959 | Tupper | 47/41.11 |
| 3,618,260 | 11/1971 | Convey | 47/32 |
| 3,891,423 | 6/1975 | Stanley et al. | 47/32 X |
| 3,940,884 | 3/1976 | Mason | 47/32 |
| 3,961,443 | 6/1976 | Insalaco | 47/32 |

*Primary Examiner*—Robert E. Bagwill
*Attorney, Agent, or Firm*—Walter F. Wessendorf, Jr.

[57] ABSTRACT

Disclosed is a device to prevent soil spillage from a flower pot that is knocked over. Adhesive backings removably fix to the flower pot comb-shaped, mounting brackets that define a plurality of spaces for adjustably positioning vertically a circular member that has a flat, screened portion with depending springs arcuately angled which terminate with a peripheral flange ring. The springs are converged to position the peripheral flange ring freely within the mounting brackets and are released to restore the flange ring to its original position to effect releasable retentive engagement complementally with the mounting bracket spaces

10 Claims, 4 Drawing Figures

FLOWER POT DEVICE

BACKGROUND OF THE INVENTION

1. Technical Field

This invention relates to a flower pot device for use with a conventional flower pot to protect the potting soil in certain house plants or potted trees in the home from children and pets, to prevent spillage of soil in the event the flower pot is knocked over. The flower pot device incorporates an upper screened portion of open-mesh design that allows air circulation, watering and fertilizing of such house plant and helps preventing of algae growth, mildew or other bacteria.

2. Background Art

The prior art, U.S. Pat. No. 915,897, discloses a flower pot cover; U.S. Pat. No. 1,453,810 discloses a tree protector; U.S. Pat. No. 1,465,636 discloses a flower holder; U.S. Pat. No. 2,381,253 discloses a flower holder and arranger; U.S. Pat. No. 2,785,508 discloses a flower pot collar plant protector; U.S. Pat. No. 2,822,644 discloses a plant protector; U.S. Pat. No. 3,618,260 discloses a weed-inhibiting and watering attachment device for potted plants; U.S. Pat. No. 3,961,443 discloses a cover for nursery pots providing improved protection, support and feeding.

The problem in the art is the need for a flower pot device that can be easily and simply mounted on a conventional flower pot to protect potting soil in certain house plants or potted trees in the home from children and pets, to prevent spillage of soil in the event the flower pot is knocked over, but a device that allows air circulation, watering and fertilizing of the house plant and prevents algae growth, mildew or other bacteria. The flower pot device must also prevent cats from scratching in the soil or from using the flower pot as an alternate litter box. The device must be easily removable from the flower pot to permit transplanting of the plant. The device must also have universal application and use with conventional flower pots for the particular size used. There should be no need to purchase a special, fitted pot.

Accordingly, the object of the invention is to contribute to the solution of the discussed problems of the prior art by providing a flower pot device comprising mounting brackets and a circular member. The mounting brackets can be removably mounted on the inside portion of a conventional flower pot. The mounting brackets have spaces which complementally receive and removably mount such circular member in adjustable vertical disposition relative to the top of the flower pot and above the potting soil. The circular member has a flat, upper screened portion of open-mesh design which protects the potting soil from spilling out in the event the flower pot is knocked over, which allows air circulation, watering and fertilizing of the house plant, which helps in preventing of algae growth, mildew and other bacteria, which prevents cats from scratching in the potting soil or from using the flower pot as an alternate litter box.

SUMMARY OF THE INVENTION

In accordance with the invention, there are provided mounting brackets and a circular member. Strip tabs are removed from the mounting brackets to expose adhesive backings which afford releasable engagement with the inside portion of the flower pot by appropriate manipulative pressure application. The comb-shaped mounting brackets define top, middle and bottom spaces to complementally receive and mount the peripheral flange of the circular member. Such spaces afford adjustable vertical disposition of the circular member relative to the top of the flower pot and above the potting soil. The screened portion of the circular member has mating radial flanges that can be opened to the center hole by pulling such flanges away from each other so that the center hole of the screened portion will fit around the plant stem. Angled springs depend from the periphery of the screened portion. Such angled springs can be converged to decrease the area they spatially occupy so that same can be disposed through the mounting brackets and released at either the top, middle or bottom spaces of the mounting brackets for adjustably mounting such circular member in a particular vertical position relative to the top of the flower pot.

BRIEF DESCRIPTION OF THE DRAWINGS

This object and other objects of the invention should be discerned and appreciated by reference to the drawings, wherein like reference numerals refer to similar parts throughout the several views. In which.

DESCRIPTION OF THE PREFERRED EMBODIMENT

Figure 1:
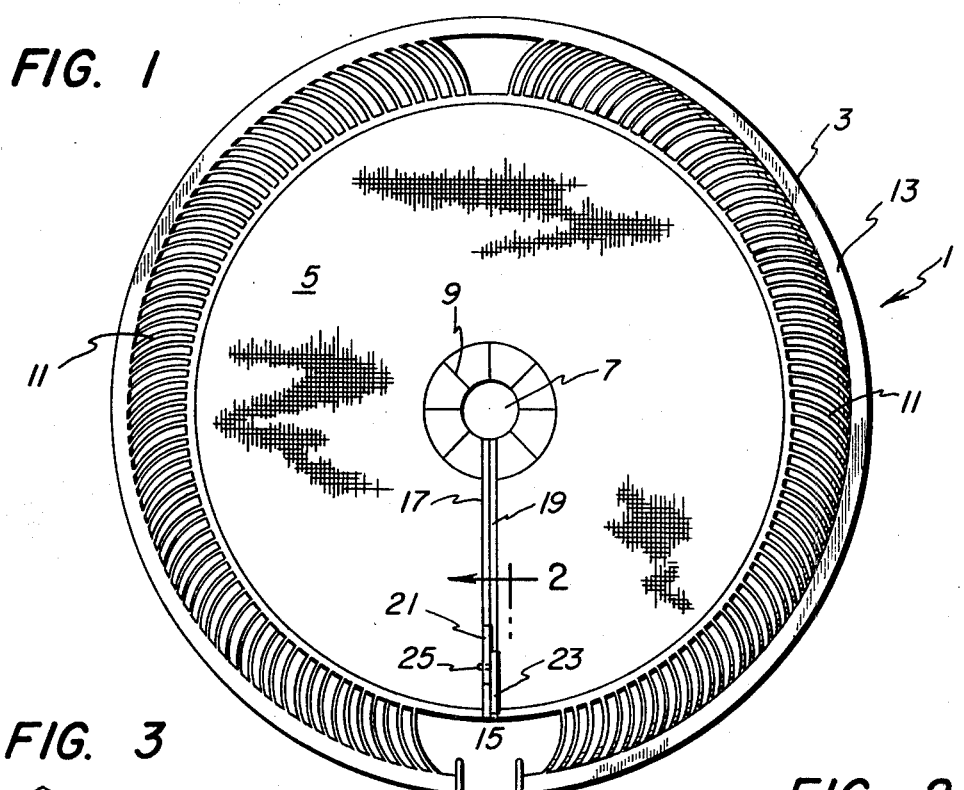
FIG. 1 is a plan of the invention.
Figure 3:
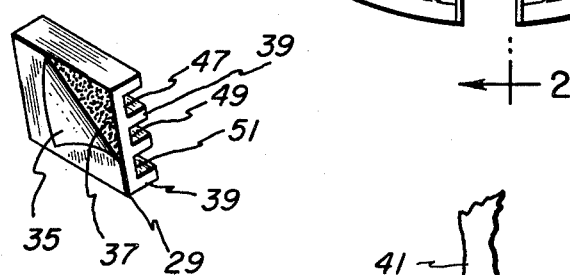
FIG. 3 is a view of a mounting bracket.
Figure 2:
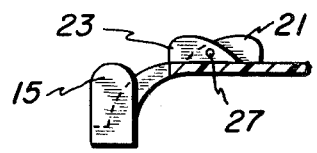
FIG. 2 is a partial sectional view in the direction of the arrows 2—2 in FIG. 1.
Figure 4:
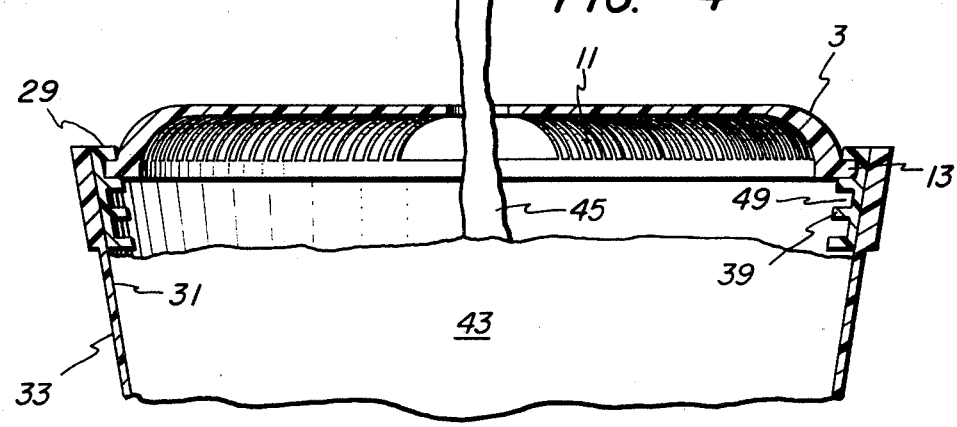
FIG. 4 is a partial sectional view of the invention mounted in the flower pot.

In FIG. 1 of the drawings, reference numeral 1 generally refers to the flower pot device of this invention.

The flower pot device 1 comprises a circular member 3 of integral, one-piece construction and of suitable plastic material such as polyethylene. Circular member 3 has a flat, upper screened portion 5 of open-mesh design, as shown, having a concentric center hole 7 with cuts 9 radiating therefrom. At the periphery of such flat, upper screened portion 5 are equally-spaced, depending springs 11 arcuately angled, as shown, and terminating with a peripheral flange ring 13 having upstanding finger grips 15. The flat, upper screened portion 5 has mating radial flanges 17 and 19 whose respective upstanding ears 21 and 23 have a pin 25 aligned with an interference-fit hole 27. Pin 25 and hole 27 are in transverse relationship with their respective ears 21 and 23. Such interference fit between pin 25 and hole 27 provides releasable locking engagement therebetween. As further shown, ears 21 and 23 are in relative offset relationship with each other to thereby facilitate manipulative engagement therewith to effect the release of pin 25 from hole 27.

Adhesive-backed mounting brackets 29 are shown removably fixed to the inside portion 31 of flower pot 33. Strip tabs 35 covering adhesive backing 37 on the mounting brackets 29 are suitably removed to expose such adhesive backing 37. Such adhesive-backed portions of the mounting brackets 29 are appropriately disposed and pressed against such inside portion 31 of the flower pot 33 to fix same therewith. The mounting brackets 29 are comb-shaped and have transversely projecting teeth 39 defining spaces therebetween which complementally receive and mount peripheral flange ring 13 therein.

After the plant 41 and potting soil 43 have been appropriately placed and disposed in the flower pot 33 so that the plant stem 46 is centrally disposed and so that the potting soil 43 will be in close proximity to circular member 3, three or more of the mounting brackets 29 are appropriately disposed and fixed to the inside portion 31 of flower pot 33 such that the top, middle and bottom spaces 47, 49 and 51 of the mounting brackets 29, defined by projecting teeth 39, are located and disposed uniform distances vertically relative to the top of the flower pot 33. With pin 25 disengaged from its aligned hole 27, circular member 3 is appropriately opened along the interface of the mating radial flanges 17 and 19 by pulling same apart from each other to slide the circular member 3 around the plant stem 45 to the center hole 7 so that center hole 7 will fit around plant stem 45. (It should be appreciated that the radiating cuts 9 will open up to spatially accommodate plant stems that are off-center relative to the flower pot 33, that spatially occupy greater space than that afforded by center hole 7, and to allow for proper growth and increased growth of the potted plant along with its plant stem.) Pin 25 is appropriately manipulated to removably lock with hole 27. The finger grips 15 are squeezed together sufficiently to converge springs 11, to thereby decrease the circular area formerly occupied by peripheral flange ring 13 and thereby to allow such peripheral flange ring 13 to be freely positioned within the mounting brackets 29, and thereupon the finger grips 15 are released to allow springs 11 to restore peripheral flange ring 13 to the original circular area it occupied and thereby effect complemental retentive engagement with the top, middle or bottom spaces 47, 49 or 51 defined by the projecting teeth 39 of the mounting brackets 29.

It should also be appreciated that the closer the proximity there is between the potting soil 43 and circular member 3, the lesser will be the likelihood of any potting soil 43 "sifting-through" the upper screened portion 5 of the circular member 3 when the flower pot 33 is knocked over.

Having thusly described my invention, I claim:

1. A device for use with a conventional flower pot to prevent spillage of soil in the event the flower pot is knocked over but to allow air circulation, watering and fertilizing of a potted house plant in said flower pot; said device comprising mounting brackets and a circular member, said mounting brackets having adhesive backings for removably affixing said mounting brackets to said flower pot, said mounting brackets having a plurality of spaces for receiving and adjustably mounting said circular member within said flower pot at a plurality of vertical positions from the top of said flower pot, and said circular member having a screened portion of open-mesh design to prevent such soil spillage, but to allow such air circulation, watering and fertilizing of such potted house plant.

2. A device in accordance with claim 1, wherein said mounting brackets are comb-shaped and have transversely projecting teeth defining therebetween said plurality of spaces.

3. A device in accordance with claim 1, wherein said circular member has a center hole to spatially accommodate a plant stem and cuts radiating from said center hole to open up thereby spatially accommodate plant stems that are off-center relative to said flower pot and to allow for increased growth of said plant stem.

4. A device in accordance with claim 1, wherein said screened portion is flat and wherein said screened portion has depending springs arcuately angled that terminate with a peripheral flange ring, and wherein said mounting bracket spaces complementally receive and thereby adjustably mount said peripheral flange ring.

5. A device in accordance with claim 4, wherein said peripheral flange ring has finger grips, wherein manipulative squeezing-together engagement of said finger grips causes said springs to converge to decrease the circular area formerly occupied by said peripheral flange ring to allow same to be freely positioned within said mounting brackets, and whereupon release of said finger grips allows said springs to restore said peripheral flange ring to its original area it occupied and thereby effect complemental retentive engagement with said mounting bracket spaces.

6. A device in accordance with claim 5, wherein said mounting brackets are comb-shaped and have transversely projecting teeth defining therebetween said plurality of spaces.

7. A device in accordance with claim 5, wherein said circular member has a center hole to spatially accommodate a plant stem and cuts radiating from said center hole to open up to thereby spatially accommodate plant stems that are off-center relative to said flower pot and to allow for increased growth of said plant stem.

8. A device in accordance with claim 5, wherein said mounting brackets are comb-shaped and have transversely projecting teeth defining therebetween said plurality of spaces, and wherein said circular member has a center hole to spatially accommodate a plant stem and cuts radiating from said center hole to open up to thereby spatially accommodate plant stems that are off-center relative to said flower pot and to allow for increased growth of said plant stem.

9. A device in accordance with claim 8, wherein said screened portion has mating radial flanges, said mating radial flanges having upstanding ears, said ears having cooperating releasable locking means, said ears being manipulative to unlock their cooperating locking means, and said mating radial flanges being openable by pulling same apart from each other to slide said circular member around the plant stem to said center hole.

10. A device in accordance to claim 1, wherein said screened portion is flat and has mating radial flanges and a center hole, said mating radial flanges having upstanding ears, said ears having cooperating releasable locking means, said ears being manipulatable to unlock their cooperating locking means, and said mating radial flanges being openable by pulling same apart from each other to slide said circular member around the plant stem to said center hole.

* * * * *